(12) United States Patent
Dinan

(10) Patent No.: US 10,264,459 B2
(45) Date of Patent: *Apr. 16, 2019

(54) AUTOMOBILE DATA TRANSMISSION OF ENCRYPTED DATA TO A SERVER VIA A BASE STATION

(71) Applicant: Ofinno Technologies, LLC, Herndon, VA (US)

(72) Inventor: Esmael Hejazi Dinan, Herndon, VA (US)

(73) Assignee: Ofinno Technologies, LLC, Herndon, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/830,512

(22) Filed: Dec. 4, 2017

(65) Prior Publication Data
US 2018/0167819 A1 Jun. 14, 2018

Related U.S. Application Data

(63) Continuation of application No. 14/827,326, filed on Aug. 16, 2015, now Pat. No. 9,838,876, which is a
(Continued)

(51) Int. Cl.
*H04K 1/00* (2006.01)
*H04W 12/10* (2009.01)
(Continued)

(52) U.S. Cl.
CPC .......... *H04W 12/10* (2013.01); *H04L 9/0618* (2013.01); *H04L 9/0637* (2013.01); *H04L 67/12* (2013.01); *H04L 69/22* (2013.01); *H04W 4/029* (2018.02); *H04W 4/80* (2018.02); *H04W 12/02* (2013.01); *H04W 12/04* (2013.01); *H04W 72/0413* (2013.01); *H04W 74/08* (2013.01); *H04L 27/2601* (2013.01); *H04L 2209/80* (2013.01); *H04L 2209/84* (2013.01)

(58) Field of Classification Search
USPC .......................................... 370/328; 380/274
See application file for complete search history.

(56) References Cited

U.S. PATENT DOCUMENTS 6,535,116 B1 3/2003 Zhou
6,662,642 B2 12/2003 Breed et al.
(Continued)

OTHER PUBLICATIONS

3GPP TS 23.122 v10.4.0 (Jun. 2011), Technical Specification, 3rd Generation Partnership Project; Technical Specification Group Core Network and Terminals; Non-Access-Stratum (NAS) functions related to Mobile Station (MS) in idle mode (Release 10).
(Continued)

*Primary Examiner* — Jeffrey C Pwu
*Assistant Examiner* — Samuel Ambaye
(74) *Attorney, Agent, or Firm* — David Grossman; Esmael Dinan; Kavon Nasabzadeh

(57) ABSTRACT

An automobile device transmits data to a server in a communication network. The automobile device records the data received from one or more transmitters located in an automobile. The automobile device transmits a random access preamble on an uplink carrier to a base station when a pre-defined condition is met. The automobile device encrypts the data and transmits the encrypted data to a server via a base station.

20 Claims, 7 Drawing Sheets

Related U.S. Application Data continuation of application No. 14/622,970, filed on Feb. 16, 2015, now Pat. No. 9,113,461, which is a continuation of application No. 13/479,126, filed on May 23, 2012, now Pat. No. 8,989,089.

(60) Provisional application No. 61/525,096, filed on Aug. 18, 2011.

(51) Int. Cl.

| | | |
|---|---|---|
| *H04L 29/06* | (2006.01) | |
| *H04W 74/08* | (2009.01) | |
| *H04L 9/06* | (2006.01) | |
| *H04W 4/029* | (2018.01) | |
| *H04W 4/80* | (2018.01) | |
| *H04W 12/02* | (2009.01) | |
| *H04L 29/08* | (2006.01) | |
| *H04W 12/04* | (2009.01) | |
| *H04W 72/04* | (2009.01) | |
| *H04L 27/26* | (2006.01) | |

(56) References Cited

U.S. PATENT DOCUMENTS

| | | |
|---|---|---|
| 6,823,258 B2 | 11/2004 | Ukai et al. |
| 6,957,133 B1 | 10/2005 | Hunt et al. |
| 6,988,026 B2 | 1/2006 | Breed et al. |
| 6,988,033 B1 | 1/2006 | Lowrey et al. |
| 7,113,127 B1 | 9/2006 | Banet et al. |
| 7,289,786 B2 | 10/2007 | Krasner |
| 7,532,963 B1 | 5/2009 | Lowrey et al. |
| 7,650,210 B2 | 1/2010 | Breed |
| 7,672,756 B2 | 3/2010 | Breed |
| 8,036,788 B2 | 10/2011 | Breed |
| 2002/0095249 A1 | 7/2002 | Lang |
| 2002/0103622 A1 | 8/2002 | Burge |
| 2005/0021197 A1 | 1/2005 | Zimmerman et al. |
| 2005/0174217 A1 | 8/2005 | Basir et al. |
| 2006/0271246 A1 | 11/2006 | Bell et al. |
| 2007/0162550 A1 | 7/2007 | Rosenberg |
| 2009/0310571 A1 | 12/2009 | Matischek et al. |
| 2010/0131304 A1 | 5/2010 | Collopy et al. |
| 2011/0222498 A1 | 9/2011 | Chun et al. |
| 2011/0225279 A1 | 9/2011 | Kalhous et al. |
| 2012/0082103 A1 | 4/2012 | Lin et al. |
| 2012/0089299 A1 | 4/2012 | Breed |
| 2012/0089474 A1 | 4/2012 | Xiao et al. |
| 2012/0106565 A1 | 5/2012 | Yousefi et al. |
| 2012/0140743 A1 | 6/2012 | Pelletier et al. |
| 2012/0164989 A1 | 6/2012 | Xiao et al. |
| 2013/0046510 A1 | 2/2013 | Bowne |

OTHER PUBLICATIONS

3GPP TS 23.401 V10.4.0 (Jun. 2011), Technical Specification, 3rd Generation Partnership Project; Technical Specification Group Services and System Aspects; General Packet Radio Service (GPRS) enhancements for Evolved Universal Terrestrial Radio Access Network, (E-UTRAN) access (Release 10).

3GPP TS 24.301 V10.3.0 (Jun. 2011), Technical Specification, 3rd Generation Partnership Project; Technical Specification Group Core Network and Terminals; Non-Access-Stratum (NAS) protocol for Evolved Packet System (EPS); Stage 3, (Release 10).

3GPP TS 36.300 V10.4.0 (Jun. 2011), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10).

3GPP TS 36.321 V10.2.0 (Jun. 2011), Technical Specification, 3rd Generation Partnership Project; Technical Specification Group Radio Access Network; Evolved Universal Terrestrial Radio Access (E-UTRA); Medium Access control (MAC) protocol specification (Release 10).

3GPP TS 36.331 V10.2.0 (Jun. 2011), Technical Specification, 3rd Generation Partnership Project; Technical Specification Group Radio Access Network; Evolved Universal Terrestrial Radio Access (E-UTRA); Resource Control (RRC); Protocol specification (Release 10).

3GPP TS 36.401 V10.2.0 (Jun. 2011), Technical Specification, 3rd Generation Partnership Project;Technical Specification Group Radio Access Network; Evolved Universal Terrestrial Radio Access Network (E-UTRAN); Architecture description (Release 10).

Automotive Industry Requirements for NEMO Route Optimization draft-ietf-mext-nemo-ro-automotive-req-02. Baldessari, et al, Jul. 19, 2009.

ETSI EN 302 571 V1.1.1 (Sep. 2008), Harmonized European Standard (Telecommunications series), Intelligent Transport Systems (ITS); Radiocommunications equipment operating in the 5 855 MHz to 5 925 MHz frequency band; Harmonized EN covering the essential requirements of article 3.2 of the R&TTE Directive.

ETSI TR 102 638 V1.1.1 (Jun. 2009), Technical Report Intelligent Transport Systems (ITS); Vehicular Communications; Basic Set of Applications; Definitions.

ETSI TS 102 636-4-1 V1.1.1 (Jun. 2011), Technical Specification, Intelligent Transport Systems (ITS); Vehicular communications; GeoNetworking; Part 4: Geographical addressing and forwarding for point-to-point and point-to-multipoint communications; Subpart 1: Media-Independent Functionality.

AUTOMOBILE DATA TRANSMISSION OF ENCRYPTED DATA TO A SERVER VIA A BASE STATION

CROSS-REFERENCE TO RELATED APPLICATIONS

This application is a continuation of application Ser. No. 14/827,326, filed Aug. 16, 2015, which is a continuation of application Ser. No. 14/622,970, filed Feb. 16, 2015, which is a continuation of application Ser. No. 13/479,126, filed May 23, 2012, now U.S. Pat. No. 8,989,089, which claims the benefit of U.S. Provisional Application No. 61/525,096, filed Aug. 18, 2011, which is hereby incorporated by reference in its entirety.

BRIEF DESCRIPTION OF THE SEVERAL VIEWS OF THE DRAWINGS

An exemplary embodiment of the present invention is described herein with reference to the drawings, in which.

Examples of several of the various embodiments of the present invention are described herein with reference to the drawings, in which.

DETAILED DESCRIPTION OF EMBODIMENTS

Example embodiments of the present invention employ a wireless device for automobile data transmission. Embodiments of the technology disclosed herein may be employed in the technical field of automobile data transmission. More particularly, the embodiments of the technology disclosed herein may relate to enhancing automobile data transmission using wireless communication systems.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
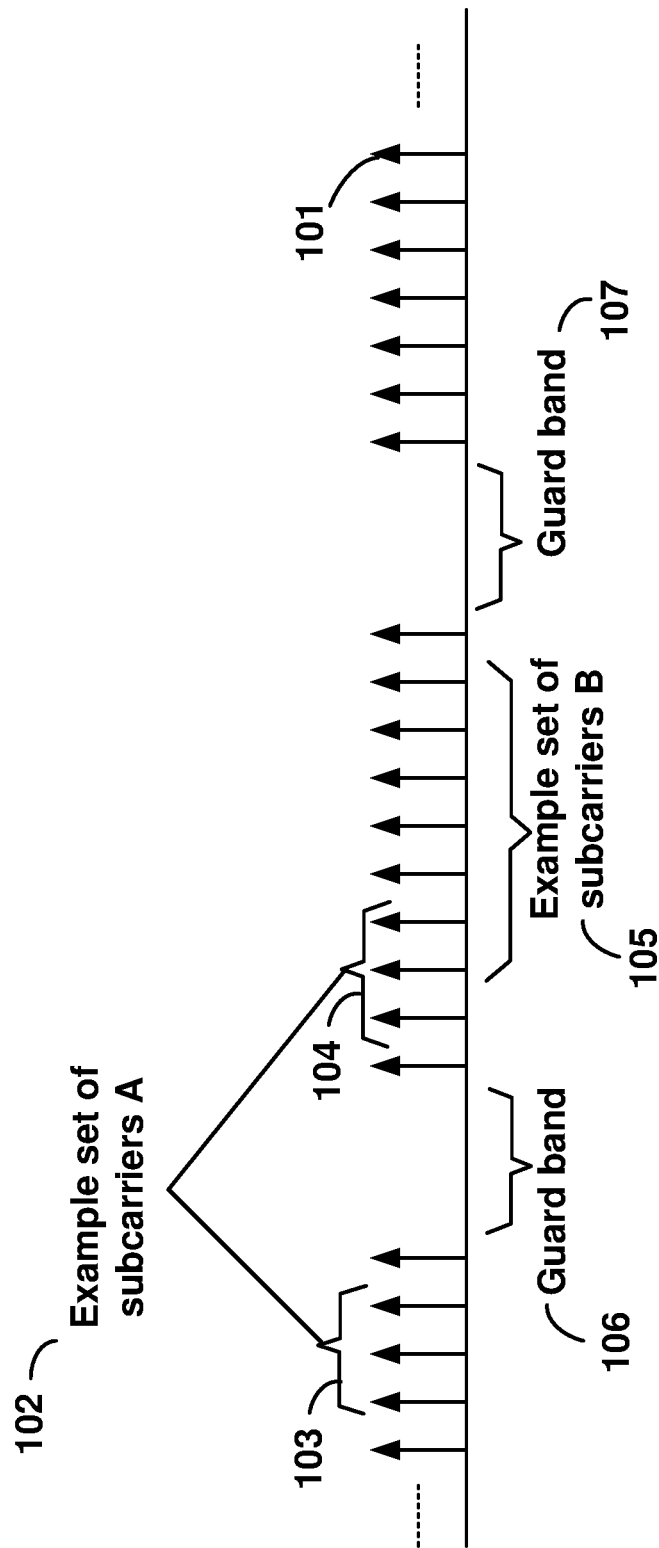
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
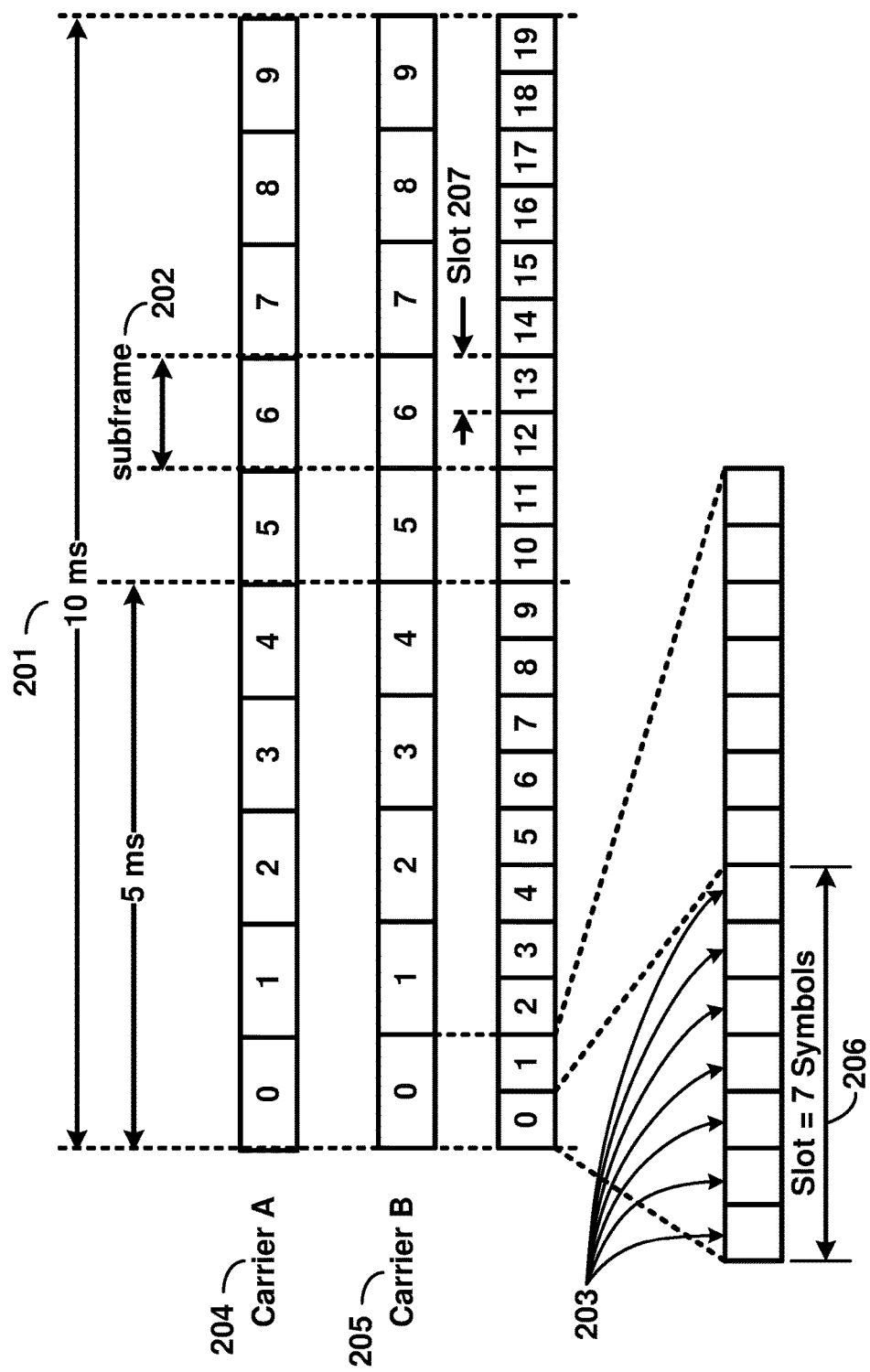
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
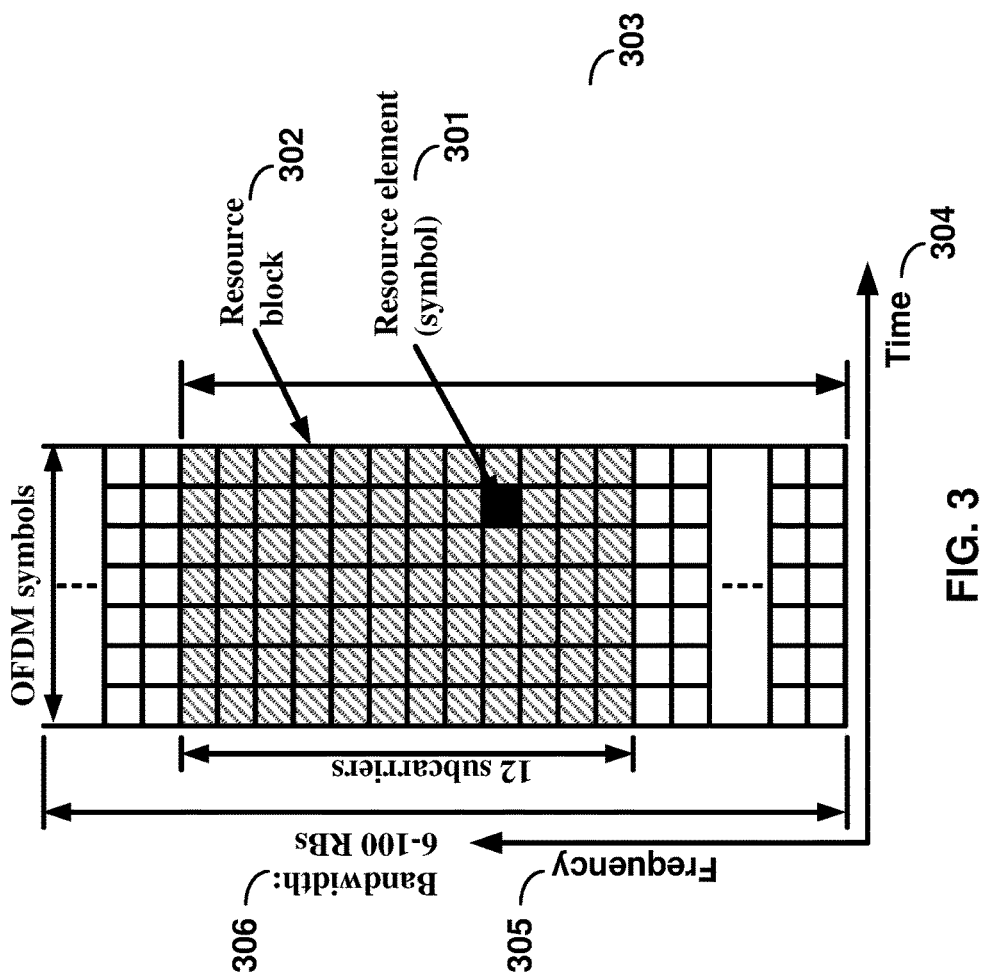
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a pre-defined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
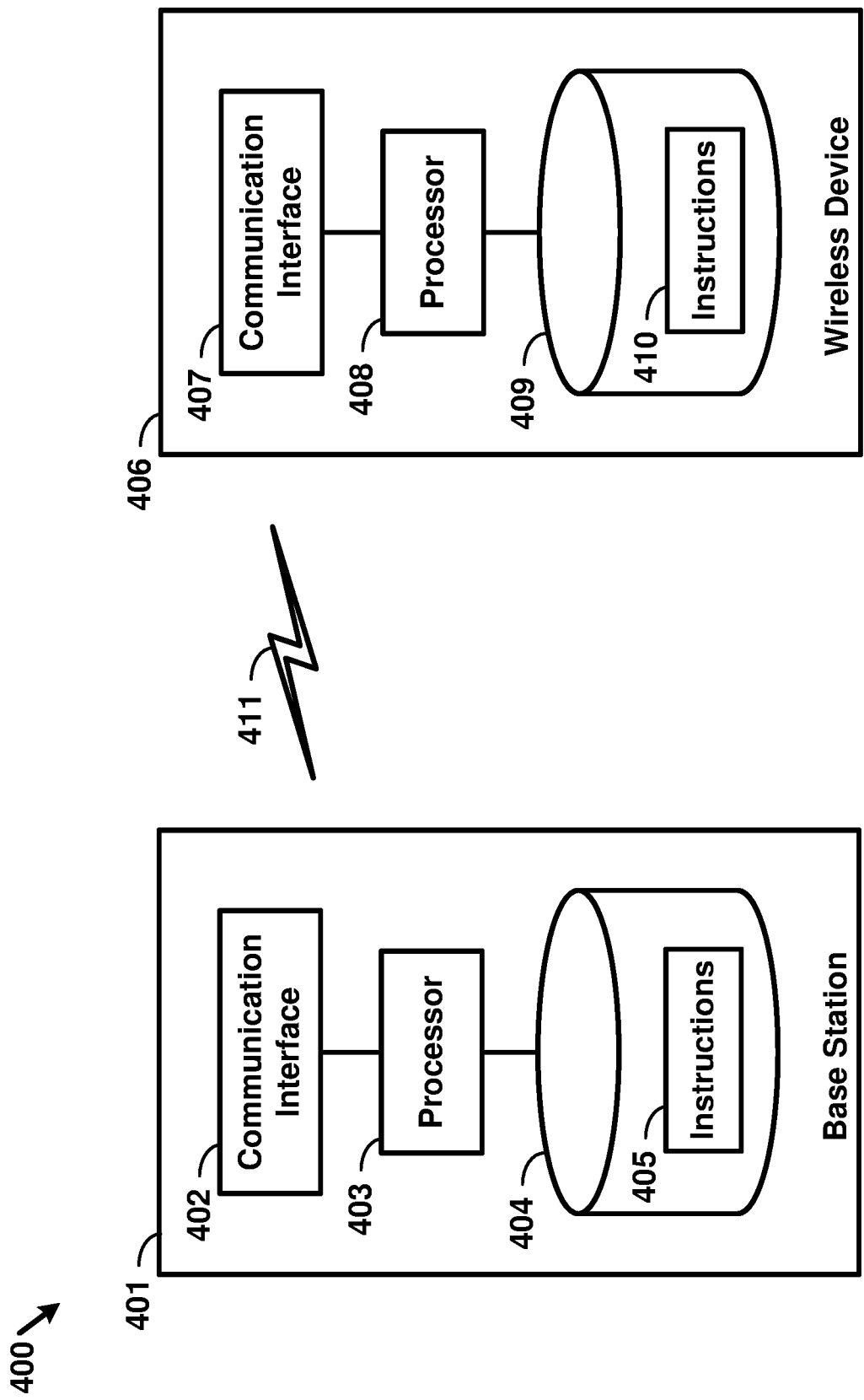
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
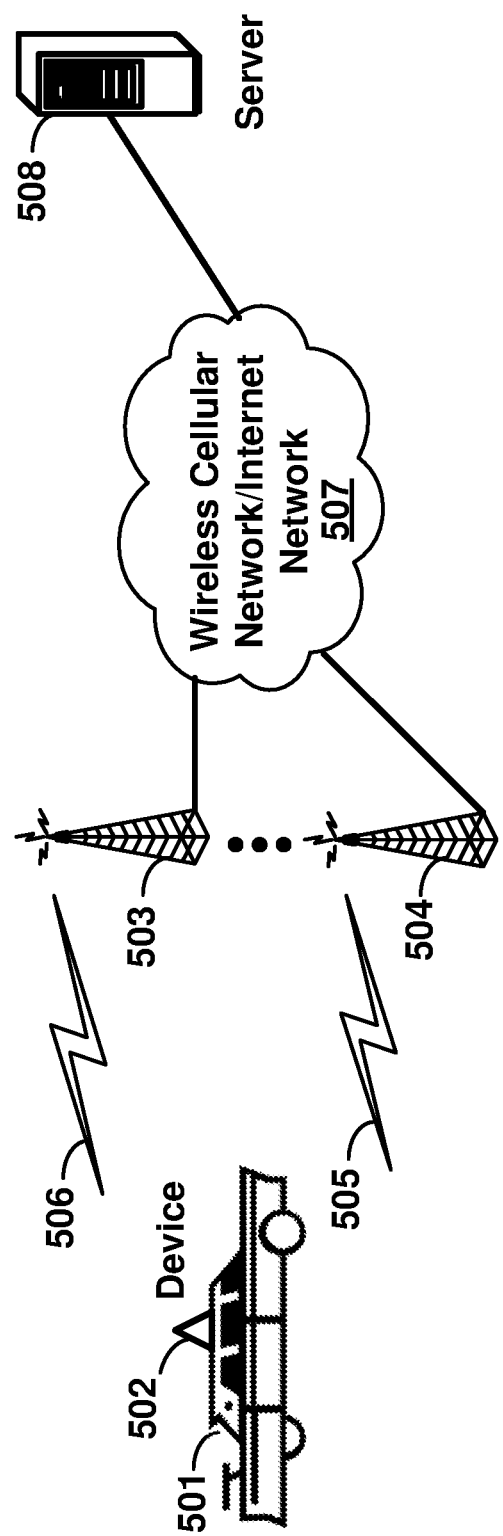
FIG. 5 is a block diagram of system for transmitting automobile data over a multicarrier OFDM radio as per an aspect of an embodiment of the present invention.

FIG. 5 is a simplified block diagram depicting a system for transmitting data traffic generated by a wireless device 502 to a server 508 over a multicarrier OFDM radio according to one aspect of the illustrative embodiments. As shown, the system includes at its core a Wireless Cellular Network/Internet Network 507, which may function to provide connectivity between one or more wireless devices 502 (e.g., a cell phone, PDA, or other wirelessly-equipped device), and one or more servers 508, such as multimedia server, application servers, email servers, or database servers.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network may include a plurality of base stations 503-504. Each base station 503-504 of the access network may function to transmit and receive RF radiation 505-506 at one or more carrier frequencies, and the RF radiation may then provide one or more air interfaces over which the wireless device 502 may communicate with the base stations 503-504. The automobile 501 may use the wireless device to receive data and control information from the base station or the server. The wireless device 502 may include applications to enable the functions described in the example embodiments. In another example embodiment, the wireless device 502 may automatically send traffic to a server 508 without direct involvement of a user.

Each of the one or more base stations 503-504 may define a corresponding wireless coverage area. The RF radiation 505-506 of the base stations 503-504 may carry communications between the Wireless Cellular Network/Internet Network 507 and access device 502 according to any of a variety of protocols. For example, RF radiation 505-506 may carry communications according to WiMAX (e.g., IEEE 802.16), LTE, microwave, satellite, MMDS, Wi-Fi (e.g., IEEE 802.11), Bluetooth, infrared, and other protocols now known or later developed. The communication between the wireless device 502 and the server 508 may be enabled by any networking and transport technology for example TCP/IP, RTP, RTCP, HTTP or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may process and/or transmit automobile data. Other example embodiments may comprise a non-transitory tangible computer readable media comprising instructions executable by one or more processors to cause processing and/or transmission automobile data. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to process and/or transmit automobile data. The device may include processors, memory, interfaces, and/or the like. Other example embodiments may comprise an automobile comprising devices such as wireless devices, sensors, processors and/or the like.

In an example embodiment of the invention, a device for monitoring and/or transmission of automobile data to a server in a communication network comprises at least one communication interface, at least one processor, and memory storing instructions that, when executed, cause the device to perform certain functions. The device may store the automobile data obtained from a plurality of sensors installed in the automobile. The device may store a network address of the server, and a network address of the device.

Figure 6:
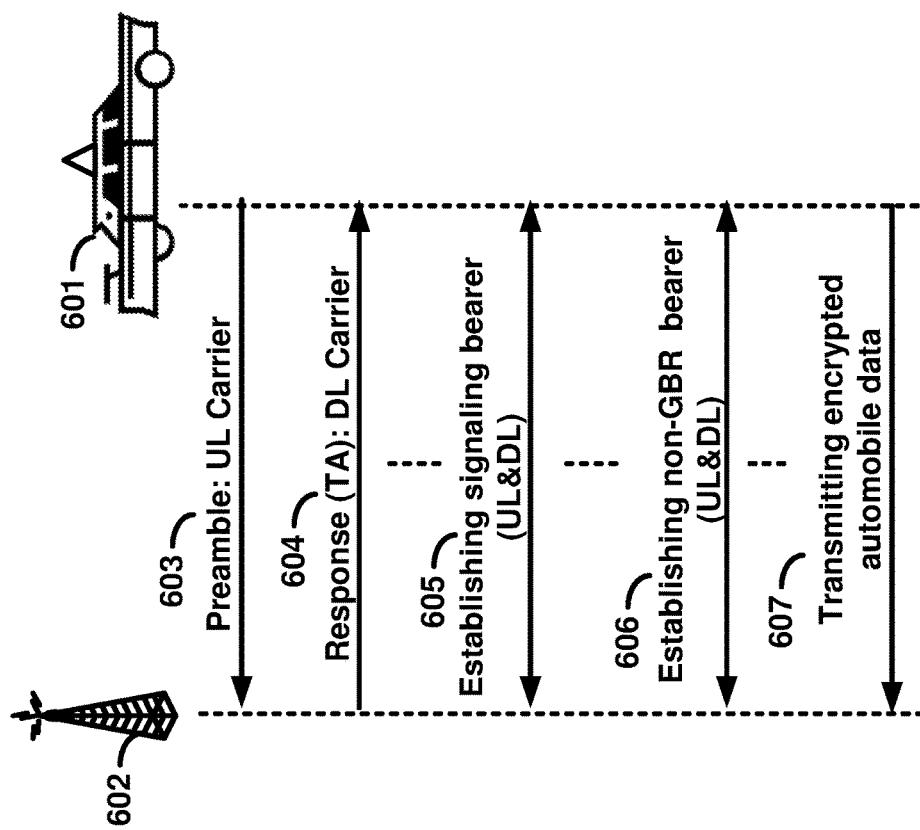
FIG. 6 depicts message flows between a base station and an automobile device as per an aspect of an embodiment of the present invention.
Figure 7:
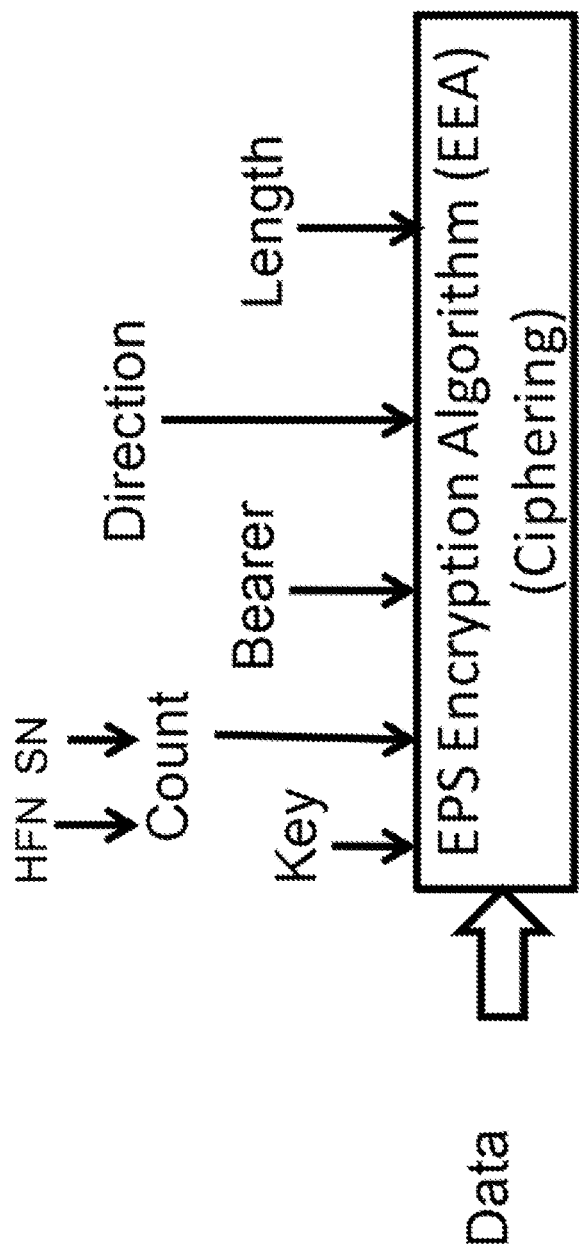
FIG. 7 is a block diagram illustrating an encryption mechanism as per an aspect of an embodiment of the present invention.

FIG. 6 depicts message flows between a base station 602 and an automobile device 601 according to an exemplary embodiment. The device 601 may transmit a random access preamble 603 on a first plurality of subcarriers of an uplink carrier to a base station, when a pre-defined condition is met. The pre-defined condition may be based on at least one of the following: automobile data collected from the plurality of sensors, the current time, a user input, and/or the like. The transmission timing of the random access preamble may be determined based on a synchronization signal received from the base station. The device 601 may receive at least one time alignment command 604 from the base station 602 in response to transmitting the random access preamble. The time alignment command may substantially align frame and subframe reception timing of the uplink carrier at the base station. The device may adjust the uplink signal transmission timing of the uplink carrier according to the time alignment command.

According to some of the various aspects of embodiments, the device may establish a signaling bearer 605 and a non-GBR bearer 606. The device may receive an Internet protocol address from the base station, over a second plurality of OFDM subcarriers of a downlink carrier. In another example, the device may be preconfigured with an Internet protocol address. The downlink carrier may correspond to the uplink carrier. The Internet address may be encrypted using a second encryption key. The device may encrypt the automobile data using a first encryption key and transmit the encrypted automobile data 607 to the base station. The base station may decrypt the automobile data before forwarding it to the server.

According to some of the various aspects of embodiments, automobile data obtained from a plurality of sensors installed in an automobile may be recorded and time stamped. The wireless device may transmit a random access preamble on a first plurality of OFDM subcarriers of an uplink carrier to a base station when a pre-defined condition is met. The pre-defined condition may be based, at least in part, on at least one of the following: the automobile data, the current time, and a user input, and/or the like. The wireless device may transmit a first message destined for a server in a communication network to the base station over a non-GBR bearer. The first message may be encrypted using a first encryption key. The first message may be configured to cause or trigger establishment of a connection to the server. The wireless device may receive a second message originating from the server from the base station over the non-GBR bearer. The second message may be configured to cause the start of transmission of the automobile data from the wireless device to the server. The second message may be encrypted using a second encryption key. The wireless device may encrypt the automobile data using the first encryption key. The wireless device may transmit the encrypted automobile data to the base station. The base station may be configured to decrypt the automobile data before forwarding the automobile data to the server.

The automobile could be one of a motorcycle, a car, a train, a bus, a truck, and/or the like. The automobile data may further comprise a time stamp when the data is obtained. The plurality of sensors may monitor automobile conditions and operator's actions including at least one of a speed, a brake action, a travelled distance, an automobile condition, an automobile location, and/or the like. The plurality of sensors may also monitor the environmental parameters of the environment of the vehicle current location. The automobile location may be calculated using Global Positioning System technology. The automobile location could be received from a navigation system installed in the automobile. The plurality of sensors may monitor automobile conditions and operator's actions comprising at least one of a tire air pressure, an engine condition, an automobile fluid condition, a temperature, a type of road driven, a safety equipment status, and/or the like.

The plurality of sensors may monitor automobile conditions and operator's actions comprising automobile environmental parameters comprising at least one of an environment temperature, an environmental chemical parameter, an environmental nuclear parameter, an environment humidity, an environment electromagnetic density, an environment particle density, and/or the like. The plurality of parameters obtained from a plurality of sensors may comprise information entered by a user operating the automobile using an input console. At least a part of the automobile data may be received via a short range wireless technology, or all the automobile data may be received via a short range wireless technology. The device may be connected to the automobile via a connector. The automobile data may be communicated to the device via an on-board computer. The device may use the electrical power provided by at least one battery installed in the automobile. The device may have its own battery, and may receive the automobile data via a short range wireless technology.

According to some of the various aspects of embodiments, the network address of the server and the network address of the device may be pre-configured in the device. The pre-defined condition may be configurable by a user operating the automobile. The pre-defined condition may be met if the value of a parameter in the plurality of parameters exceeds certain threshold. The pre-defined condition may be met when the automobile engine is turned off, or when the automobile is turned off, or when the automobile engine is turned on, or when the automobile is turned on, and/or according to the value of an internal timer. Other conditions may also be possible.

The synchronization signal may comprise a primary synchronization signal and a secondary synchronization signal on the downlink carrier. The synchronization signal may indicate a physical cell ID for a cell comprising the downlink carrier and provide timing information for the downlink carrier. The synchronization signal may be transmitted by the base station using a third plurality of OFDM subcarriers substantially in the center of the frequency band of the downlink carrier on the first and sixth subframe of each frame. Random access parameters may be received from the base station. The parameters could be used for generating the random access preamble.

The automobile data could be encrypted using a first encryption key and an additional parameter that changes substantially rapidly over time. FIG. 8 is a block diagram illustrating an encryption mechanism according to an exemplary embodiment. Data and control packets are encrypted using EPS encryption algorithm. The encryption algorithm input parameters may include a key, hyper frame number, sequence number, bearer identity, uplink or downlink direction parameter, or packet length. For example system frame number is the parameter that changes substantially rapidly over time. Substantially rapidly means the parameter may change with a period in the range of 1 s, 10 s or 100 msec. The control packets may also use an integrity mechanism that uses at least one of these parameters in the integrity checksum calculation process.

According to some of the various aspects of embodiments, the non-GBR bearer could be a default bearer with no guaranteed minimum bit rate or with a guaranteed minimum bit rate. The non-GBR bearer may be a default bearer, and may be assigned a maximum allowed transmission rate. A control message, for example, an RRC establishment message may be received on a first data channel on the downlink carrier before establishing the non-GBR bearer. The control message, for example RRC establishment message, may establish a first signaling bearer. The first signaling bearer may be established on the downlink carrier and the uplink carrier. A security context may be established with the base station using the first signaling bearer.

According to some of the various aspects of embodiments, the base station may receive the Internet protocol address from another network node. A first message to the server may be transmitted over the non-GBR bearer. The first message is encrypted using a first encryption key. The first message triggers establishing a connection with the server. A second message from the server may be received over the non-GBR bearer. The second message could trigger start of transmission of the automobile data from the device to the server. The second message may be encrypted using the second encryption key. The automobile data could be encrypted using a first encryption key and an additional parameter that changes substantially rapidly over time.

According to some of the various aspects of embodiments, the server may include a plurality of server computers. The server could be a distributed server or a server farm. Transmitting the encrypted automobile data could comprise transmitting a plurality of data packets, such as MAC layer data packets. Transmitting the plurality of data packets could comprise transmitting each of the plurality of data packets in two parts. A first part is transmitted on a fourth plurality of subcarriers in a first time period, and a second part is transmitted on a fifth plurality of subcarriers in a second time period. All or at least one of the following constraints may apply: a) the first time period and the second time period do not overlap, b) the fourth plurality of subcarriers and fifth plurality of subcarriers are different, and c) the fourth plurality of subcarriers consists of a plurality of contiguous subcarriers, and the fifth plurality of subcarriers consists of a plurality of contiguous subcarriers. The base station may forward the automobile data comprising a plurality of data messages using Internet protocol. The base station may add a header to each message in the plurality of data messages. The header may include the IP address of the base station and an IP address of an intermediate node between the base station and the server.

The server may analyze the automobile data to determine a risk factor for the automobile, a possible issue with the automobile, or a required service for the automobile. The server could analyze the automobile data to determine at least one of the following for at least one driver driving the automobile: a risk factor, a driving habit, or a discount plan. The server analyzes the automobile data to determine at least one of the following for the environment the automobile was driven: a) environmental hazards or alerts, b) environment behavior, and c) environmental risks. The server may receive automobile data from a plurality of devices, wherein each device may be installed in a different automobile, or multiple devices may be installed in the same automobile. The server may analyze automobile data from the plurality of devices to determine a parameter related to a plurality of drivers, a parameter related to the plurality of automobiles, or a parameter related to an environment. The server may provide access to at least a summary of the automobile data to a user via Internet. The server could encrypt the at least a summary of the automobile data before transmitting the data to a user computer via Internet. In another example embodiment, an automobile is considered including the device as described in the above examples. An automobile including the device may be implemented or manufactured, wherein the device receives the automobile data or at least a part of the automobile data via a short range wireless technology.

According to some of the various aspects of embodiments, a device for monitoring and transmission of automobile data to a server in a communication network is implemented. The device may comprise at least one communication interface, at least one processor, and memory storing instructions that, when executed, cause the device to perform certain functions. The device may record the automobile data comprising a plurality of parameters obtained from a plurality of sensors installed in the automobile and the time the plurality of parameters are obtained. The device may store a network address of the server, and a network address of the device. The device may transmit a random access preamble on a first plurality of OFDM subcarriers of an uplink carrier to a base station, when a pre-defined condition is met. The pre-defined condition may be based on at least one of the following: the automobile data collected from the plurality of sensors, current time, a user input, and/or the like. The device may establish a non-GBR bearer. The device may receive an Internet protocol address from the base station, over a second plurality of OFDM subcarriers of a downlink carrier. The downlink carrier may correspond to the uplink carrier. The Internet address may be encrypted using a second encryption key. In another example, the Internet protocol address may be pre-configured in the device. The device may transmit a first message to the server over the non-GBR bearer. The first message may encrypt using a first encryption key. The first message may trigger a connection to the server. The device may receive a second message from the server over the non-GBR bearer. The second message could trigger start of transmission of automobile data from the device to the server. The second message could be encrypted using the second encryption key. The device may encrypt the automobile data using the first encryption key and may transmit the encrypted automobile data to the base station. The base station could decrypt the automobile data before forwarding it to the server.

According to some of the various aspects of embodiments, a device for monitoring and transmission of automobile data to a server in a communication network may comprise at least one communication interface, at least one processor, and memory storing instructions that, when executed, cause the device to perform certain functions. The device may record the automobile data comprising a plurality of parameters obtained from a plurality of sensors installed in the automobile. The device may store a network address of the server, and a network address of the device. The device may transmit a random access preamble on a first plurality of subcarriers of an uplink carrier to a base station. The random access preamble may be transmitted according to an internal decision process in the device, which could be implementation specific. For example, the random access preamble may be transmitted when a pre-defined condition is met based on the automobile data collected from the plurality of sensors, current time, a user input, and/or the like. The random access preamble transmission may be triggered for other reasons including factors related to radio link parameters, network related parameters, automobile related parameters, environment parameters, or user/factory pre-defined parameters. The device may establish a non-GBR bearer and receive an Internet address from the base station, over a second plurality of OFDM subcarriers of a downlink carrier. The downlink carrier may correspond to the uplink carrier. The Internet address is encrypted using a second encryption key. The device may encrypt the automobile data using a first encryption key and transmitting the encrypted automobile data to the base station. The base station could decrypt the automobile data before forwarding it to the server.

According to some of the various aspects of embodiments, an apparatus for transmission of automobile data to the wireless device may comprise at least one communication interface, at least one processor, and memory storing instructions that, when executed, cause the apparatus to perform certain functions. The apparatus may record the automobile data obtained from a plurality of sensors installed in the automobile. The apparatus may transmit the automobile data via a short range wireless technology to the wireless device.

According to some of the various aspects of embodiments, an apparatus for transmission of automobile data to the wireless device may comprise at least one communication interface, at least one processor, and memory storing instructions that, when executed, cause the apparatus to perform certain functions. The apparatus may record the automobile data comprising a plurality of parameters obtained from a plurality of sensors installed in the automobile. The apparatus may transmit the automobile data via a short range wireless technology to the wireless device. The wireless device may establish a connection with a remote server, and may transmits at least a part of the automobile data received from the apparatus via a wireless technology. The apparatus may be a part of an automobile, or may be connected to a connector in the automobile, or be an stand-alone apparatus.

According to some of the various aspects of embodiments, an apparatus for transmission of automobile data to the wireless device may comprise at least one communication interface, at least one processor, and memory storing instructions that, when executed, cause the apparatus to perform certain functions. The apparatus may record the automobile data comprising a plurality of parameters obtained from a plurality of sensors installed in the automobile. The apparatus may receive a request message from the wireless device to establish a connection. The apparatus may transmit a response message to the wireless device. The response message may establish the connection. The apparatus may transmit the automobile data via a short range wireless technology to the wireless device using the connection. The apparatus may be a part of an automobile, or may be connected to a connector in the automobile, or be an stand-alone apparatus.

According to some of the various aspects of embodiments, at least two types of networks may be defined for short range wireless (SRW) technology: Ad-hoc and client/server. The Ad-hoc network is a network where communications may be established between multiple stations in a given coverage area without the use of an access point or server. The etiquette may be specified that each station may observe so that all units have fair access to the wireless media. Methods for arbitrating requests could be specified to use the media to enable that throughput is maximized for all of the users in the base service set. The client/server network may use an access point that controls the allocation of transmit time for stations and may allow mobile stations to roam from cell to cell. The access point may be used to handle traffic from the mobile radio to the wired or wireless backbone of the client/server network. This arrangement allows for point coordination of all the stations in the basic service area and ensures proper handling of the data traffic. The access point routes data between the stations and other wireless stations or to and from the network server. SRW may use the ad-hoc mode. This may mean that a station may give other units fair access to the wireless media. SRW may also use the client/server mode.

Functionally, three core protocols may be implemented. The logical link control and adaptation protocol (L2CAP), the service discovery protocol (SDP) and the RFCOMM protocol. L2CAP, which may adapt upper layer protocols over the baseband, may provide data services to the high layer protocols with protocol multiplexing capability, segmentation and reassembly operations, and group abstractions. Device information, services and the characteristics of the services may be queried using the SDP. Like SDP, RFCOMM may be layered on top of the L2CAP. As a cable replacement protocol, RFCOMM may provide transport capabilities for high-level services (e.g. OBEX protocol) that may use serial line as the transport mechanism. The SRW air interface may be based on a nominal antenna power of for example, 0 dBm. Spectrum spreading may be added to facilitate optional operation at power levels up to 100 mW worldwide. This may be accomplished by frequency hopping.

According to some of the various aspects of embodiments, at least 2 types of physical links may be defined: SCO (Synchronous Connection-Oriented), and ACL (Asynchronous Connection-Less). The SCO link may be point-to-point between master and slave. The master may maintain the link by using reserved timeslots at regular intervals. Packet retransmissions may not be allowed. ACL may provide packet-switched connections between the master and all active slaves. Packet retransmissions may be applied to assure data integrity. SRW uses frequency hopping in timeslots. SRW has been designed to operate in noisy radio frequency environments, and uses a fast acknowledgement and a frequency-hopping scheme to make the communications link robust, communication-wise. SRW radio may avoid interference from other signals by hopping to a new frequency after transmitting or receiving a packet.

Compared with other systems operating in the same frequency band, the SRW radio may hop faster and may use shorter packets. Short packages and fast hopping may limit the impact of other sources of disturbances. Use of Forward Error Correction (FEC) may limit the impact of random noise on long-distance links. Software controls and identity coding built into each microchip may ensure that those units preset by their owners could communicate.

SRW may work in an ad-hoc fashion, and communication may be done vis-a-vi the Master unit. There may not be a direct communication between slave units. It may not be intended for the Master to route messages between slave units. If slave units find that they want to talk directly to each other, they may form a new piconet, with one of them acting as Master. This may not mean that they have to leave the previous piconet. More likely, they may be parked in the old net unless they decide to quit the old net altogether. Reconfiguration in SRW may be dynamic.

The SRW baseband protocol may be a combination of circuit and packet switching. Time slots could be reserved for synchronous packets. A frequency hop may be done for each packet that is transmitted. A packet nominally covers a single time slot, but may be extended to cover up to five slots. SRW could support an asynchronous data channel, or up to 3 simultaneous synchronous voice channels, or a channel which simultaneously supports asynchronous data and synchronous voice.

A piconet may be created in one of different ways: a page (used by Master to connect to Slave), a page scan (a unit listens for its' device access code), a Master—Slave switch may be made, An "Unpark" of a unit may be made (provided there are no active slaves). In order to establish new connections the procedures inquiry and paging may be used. The inquiry procedure may enable a unit to discover which units are in range, and what their device addresses and clocks are. With the paging procedure, an actual connection could be established. The SRW device address may be required to set up a connection. Knowledge about the clock would accelerate the setup procedure. A unit that establishes a connection would carry out a page procedure and would automatically become the master of the connection.

According to some of the various aspects of embodiments, for the paging process, several paging schemes may be applied. A paging scheme may be supported by each SRW device. This scheme is used when units meet for the first time, and in case the paging process directly follows the inquiry process. Two units, once connected using a paging/ scanning scheme, may agree on an optional paging/scanning scheme. After the paging procedure, the master may poll the slave by sending Poll or Null packets, to which the slave responds. LMP (link manager protocol) procedures that may not require any interactions between the LM and the host at the paged unit's side could then be carried out. When the paging device wishes to create a connection involving layers above LM, it sends LMP_host_connection_req. When the other side receives this message, the host is informed about the incoming connection. The remote device could accept or reject the connection request by sending LMP_accepted or LMP_not_accepted. When a device does not require any further link set-up procedures, it may send LMP_set-up_complete. The device may respond to requests from the other device. When the other device is also ready with link set-up, it may send LMP_setup_complete. After this, the first packet on a logical channel different from LMP may then be transmitted.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be $\{0,1\}$ or $\{0, 1, 2, 3\}$. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) $\{5, \{7\}, \{8\},$ or $\{7, 8, \ldots, v+6\}$, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula(s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards.

Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula(s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method comprising:
receiving first data from one or more transmitters located in an automobile;
transmitting a random access preamble on an uplink carrier to a base station when a pre-defined condition is met based, at least in part, on the first data or a value of an internal timer or a user input;
receiving a time alignment command from the base station in response to transmitting the random access preamble;
adjusting uplink signal transmission timing of the uplink carrier according to the time alignment command;
transmitting, to the base station over a non-guaranteed bit rate (non-GBR) bearer, a first message destined for a server in a communication network, the first message being configured to trigger establishment of a connection to the server;
receiving, from the base station over the non-GBR bearer, a second message originating from the server, the second message being configured to cause transmission of the first data to the server;
encrypting the first data; and transmitting the encrypted first data to the base station employing an established non-guaranteed bit rate bearer, wherein the base station is configured to decrypt the first data before forwarding the first data to the server in a communication network.

2. The method of claim 1, wherein the transmission timing of the random access preamble is determined based, at least in part, on a synchronization signal received from the base station.

3. The method of claim 1, further comprising receiving random access parameters from the base station, the random access parameters being employed for generating the random access preamble.

4. The method of claim 1, further comprising receiving an Internet protocol address from the base station over a downlink carrier before transmitting the first data, the downlink carrier corresponding to the uplink carrier.

5. A method comprising:
receiving first data from one or more transmitters located in an automobile;
transmitting a random access preamble on an uplink carrier to a base station when a pre-defined condition is met based on at least one of the following: the first data; a value of an internal timer; and a user input;
transmitting, to the base station over a non-guaranteed bit rate (non-GBR) bearer, a first message destined for a server in a communication network, the first message being configured to trigger establishment of a connection to the server;
receiving, from the base station over the non-GBR bearer, a second message originating from the server, the second message being configured to cause transmission of the first data to the server;
encrypting the first data; and
transmitting, to the base station, the encrypted first data, the base station being configured to decrypt the first data before forwarding the first data to the server.

6. The method of claim 5, further comprising receiving at least a part of the first data via a short range wireless technology.

7. The method of claim 5, further comprising storing, by a wireless device:
a first network address of the server; and
a second network address of an automobile device.

8. The method of claim 5, wherein:
the first message is encrypted using a first encryption key;
the first data is encrypted using the first encryption key; and
the second message is encrypted using a second encryption key different from the first encryption key.

9. The method of claim 5, further comprising receiving a control message on a first data channel on a downlink carrier before establishing the non-GBR bearer, the control message establishing a first signaling bearer, the first signaling bearer being established on the downlink carrier and the uplink carrier.

10. The method of claim 5, wherein the second message is destined to one of the one or more transmitters.

11. A method comprising:
receiving signals via a first short range wireless technology from one or more transmitters in an automobile;
transmitting a random access preamble on an uplink carrier to a base station when a pre-defined condition is met based on at least one of: the received signals; a value of an internal timer; and a user input;
transmitting, to the base station over a non-guaranteed bit rate (non-GBR) bearer, a first message destined to a server in a communication network, the first message being configured to trigger establishment of a connection to the server;
receiving, from the base station over the non-GBR bearer, a second message originating from the server, wherein the second message being configured to cause transmission of first data to the server;
receiving and encrypting first data from the one or more transmitters; and
transmitting, the encrypted first data to the base station, the base station being configured to decrypt the first data before forwarding the first data to the server.

12. The method of claim 11, wherein the transmission timing of the random access preamble is determined based, at least in part, on a synchronization signal received from the base station.

13. The method of claim 11, wherein the one or more transmitters comprise a display and receive the user input.

14. The method of claim 11, wherein the one or more transmitters monitor automobile conditions comprising at least one of: a tire air pressure; an engine condition; an automobile fluid condition; a temperature; a type of road driven; and a safety equipment status.

15. The method of claim 11, wherein the one or more transmitters monitor automobile conditions comprising automobile environmental parameters comprising at least one of: an environment temperature; an environmental chemical parameter; an environmental nuclear parameter; an environment humidity; an environment electromagnetic energy density; and an environment particle density.

16. The method of claim 11, wherein the server analyzes the first data to determine a risk factor for the automobile, a possible issue with the automobile, or a required service for the automobile.

17. The method of claim 11, wherein:
the server receives the first data from a plurality of automobile devices, wherein each automobile device is installed in a different automobile; and
the server analyzes the first data from the plurality of automobile devices to determine a parameter related to a plurality of drivers, a parameter related to the plurality of automobiles, or a parameter related to an environment from which the first data is received.

18. The method of claim 11, wherein the second message is destined to one of the one or more transmitters.

19. The method of claim 11, wherein the server receives one or more location information and one or more timestamps with the first data.

20. The method of claim 11, further comprising storing, by a wireless device:
a first network address of the server; and
a second network address of an automobile device.

* * * * *